United States Patent
Chi et al.

(10) Patent No.: US 10,855,162 B2
(45) Date of Patent: Dec. 1, 2020

(54) SECONDARY OF LINEAR MOTOR

(71) Applicant: HIWIN MIKROSYSTEM CORP., Taichung (TW)

(72) Inventors: Cheng-Te Chi, Taichung (TW); Chao-Chin Teng, Taichung (TW); Hui-Ming Chen, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 635 days.

(21) Appl. No.: 15/365,836

(22) Filed: Nov. 30, 2016

(65) Prior Publication Data
US 2018/0152092 A1  May 31, 2018

(51) Int. Cl.
| | |
|---|---|
| *H02K 1/18* | (2006.01) |
| *H02K 1/28* | (2006.01) |
| *H02K 41/03* | (2006.01) |
| *H02K 1/17* | (2006.01) |
| *H02K 1/27* | (2006.01) |

(52) U.S. Cl.
CPC ............. *H02K 41/031* (2013.01); *H02K 1/17* (2013.01); *H02K 1/18* (2013.01); *H02K 1/27* (2013.01); *H02K 1/28* (2013.01); *H02K 41/033* (2013.01); *H02K 2201/09* (2013.01)

(58) Field of Classification Search
CPC .. H02K 1/17; H02K 1/18; H02K 1/27; H02K 1/28; H02K 41/031; H02K 41/033; H02K 2201/09
USPC ............................ 310/12.24, 12.25, 216.048
See application file for complete search history.

(56) References Cited

U.S. PATENT DOCUMENTS

| | | | | |
|---|---|---|---|---|
| 6,825,583 B2* | 11/2004 | Joung | ..................... | H02K 41/03 310/12.29 |
| 2006/0033386 A1* | 2/2006 | Uchida | .................. | H02K 41/03 310/12.04 |
| 2009/0051227 A1* | 2/2009 | Kim | ........................ | H02K 41/03 310/12.24 |

* cited by examiner

*Primary Examiner* — Jue Zhang
*Assistant Examiner* — David A. Singh
(74) *Attorney, Agent, or Firm* — Guice Patents PLLC

(57) ABSTRACT

The present invention provides a secondary side of a linear motor, which mainly includes a base, a combining mechanism and multiple magnetic members, wherein the base has multiple plates that are sequentially stacked into a block; the combining mechanism is configured to combine the plate-shaped bodies; and the magnetic members are disposed on the base in a separated manner.

6 Claims, 7 Drawing Sheets

SECONDARY OF LINEAR MOTOR

BACKGROUND OF THE INVENTION

Field of the Invention

The present invention relates to a linear motor, and more particularly to a secondary side of a linear motor.

Description of the Related Art

In the technical field of linear motors, to achieve better structural rigidity of a base on which magnetic members are disposed in the construction of a secondary side, a low-carbon steel base material is generally machined into a specific size through processes such as milling, grinding and surface treatment, for permanent magnets in the construction of the secondary side to be disposed. However, the manufacturing process and the machining process in such techniques are too complex, so that the manufacturing efficiency is poor and it is difficult to reduce the cost.

In addition, to reduce eddy current loss of a primary side, multiple silicon steel sheets coated with an insulating layer are stacked into a block for coils to be disposed. This technical solution has been widely and publicly used in the technical field of rotary motors, but has not been applied in the technical field of linear motors. The reason is that a linear motor may generate a normal force in the vertical direction in addition to a thrust for linear movement, and attraction and repulsion effects exist between the primary side and the secondary side, which forces would result in that the silicon steel sheets stacked into a block are damaged by stripping from each other under the repeated attraction and repulsion effects. Therefore, in the disclosed or applied techniques, no specific feasible technical solution in which multiple silicon steel sheets may be stacked to form a secondary side of a linear motor has been disclosed.

SUMMARY OF THE INVENTION

Therefore, the main objective of the present invention is to provide a secondary side of a linear motor, wherein multiple plates are sequentially stacked into a block and a combining mechanism is used for providing a better combining force between the plate-shaped bodies, such that the plates are prevented from being stripped from each other due to magnetic attraction and repulsion effects.

Accordingly, to achieve the above objective, the present invention provides a secondary side of a linear motor, which mainly includes a base, having multiple plates that are sequentially stacked into a block; a combining mechanism, for combining the plate-shaped bodies; and multiple magnetic members, disposed on the base in a separated manner.

The materials of the plates may be all or partially magnetically conductive or non-magnetically conductive.

The essential characteristic of the combining mechanism is to provide sufficient combining strength between the plate-shaped bodies. Thus, any technical means capable of achieving the above function is applicable, and for example, combining elements such as rivets, rivet protrusions, screws, or bolts, or technical means such as welding or adhesion all fall within the specific technical solution of the combining mechanism.

DETAILED DESCRIPTION OF THE PREFERRED EMBODIMENTS

Figure 1:
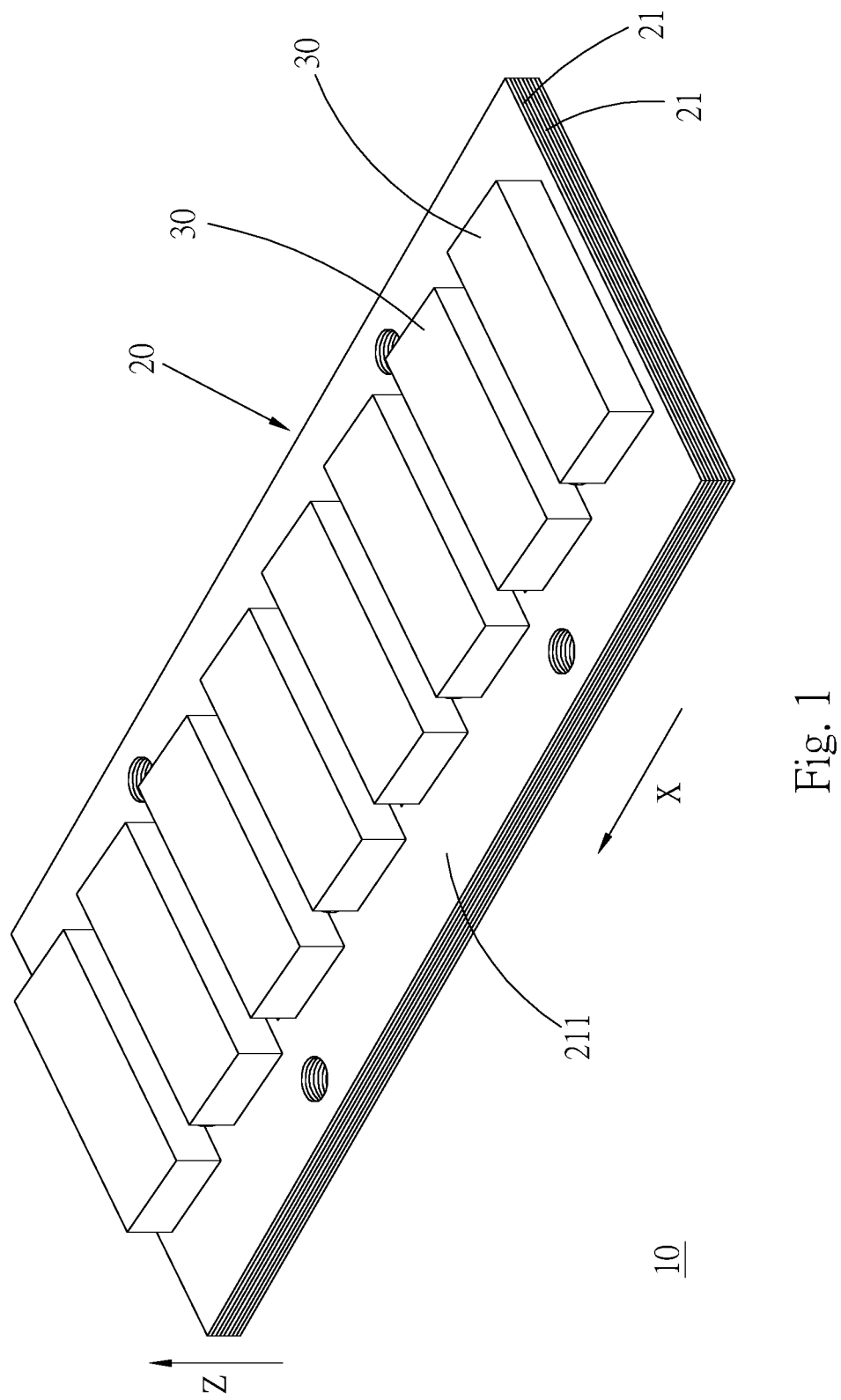
FIG. 1 is a perspective view of a secondary side of a linear motor according to an embodiment of the present invention.
Figure 2:
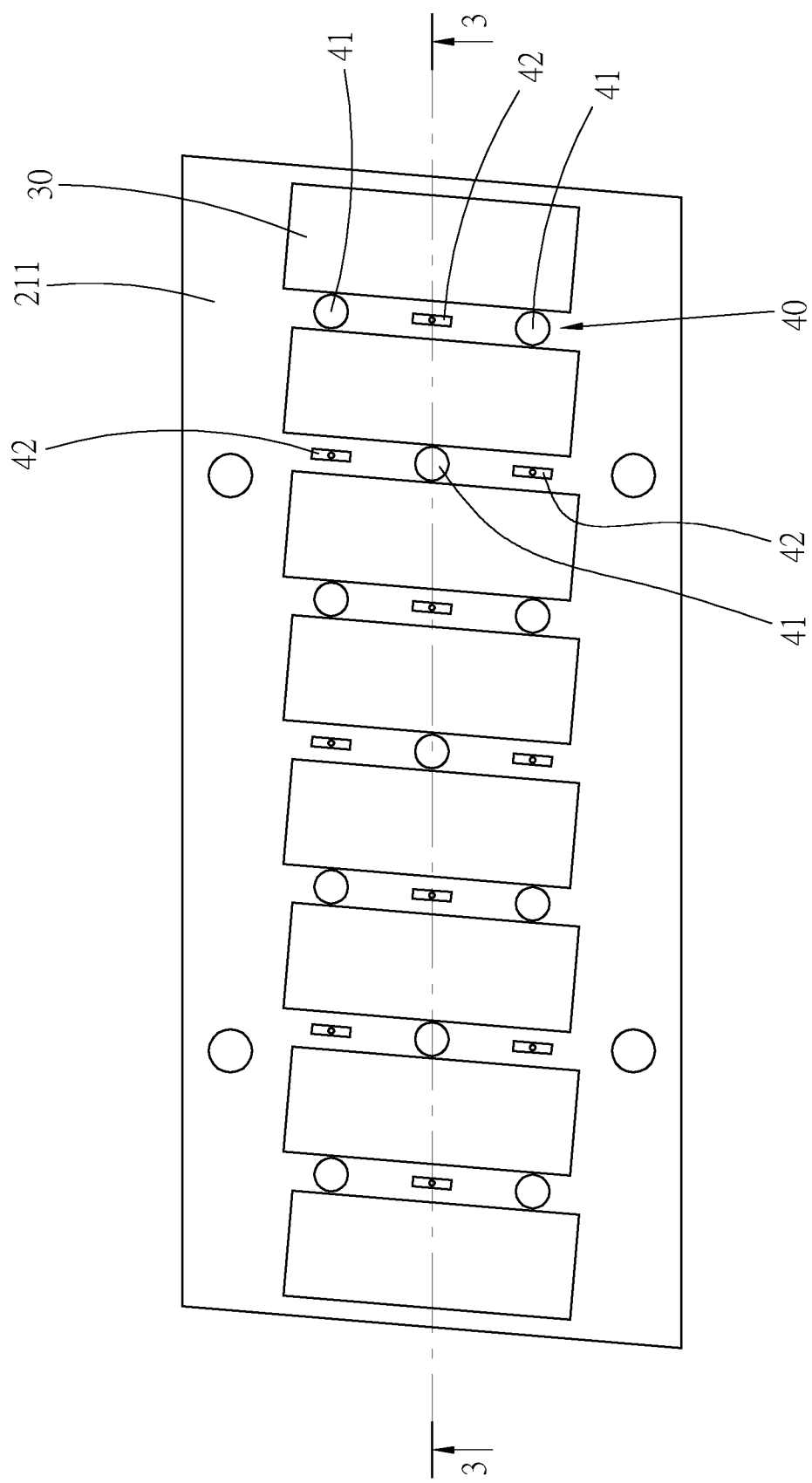
FIG. 2 is a top view of the secondary side of the linear motor according to the embodiment of the present invention.
Figure 3:
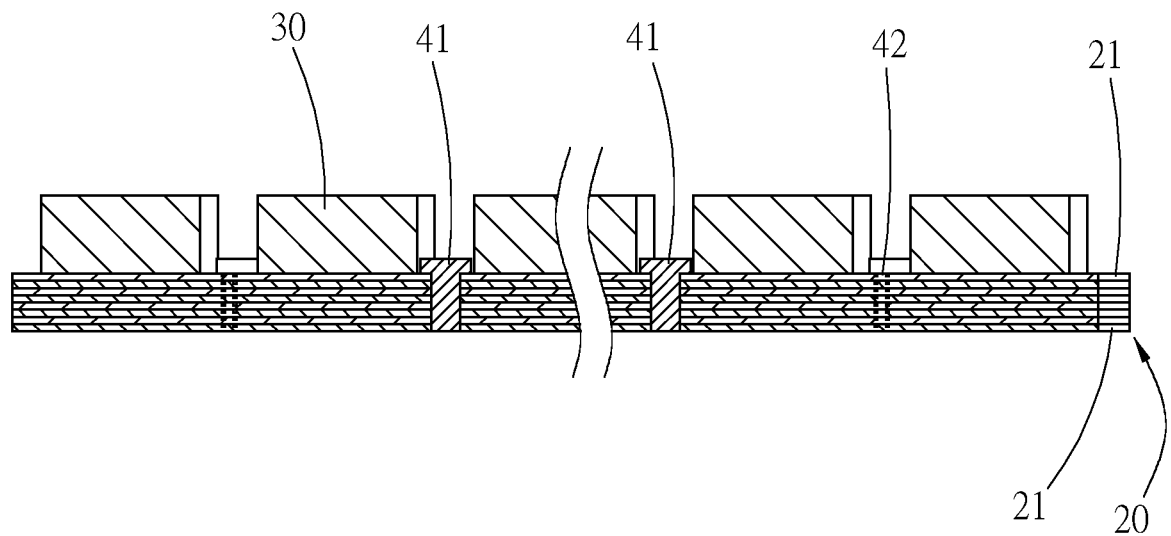
FIG. 3 is a cross-sectional view along a section line 3-3 in FIG. 1 of the secondary side of the linear motor according to the embodiment of the present invention.

Firstly, referring to FIG. 1 to FIG. 3, a secondary side (10) of a linear motor provided in an embodiment of the present invention is used as a stator element of a linear motor that provides linear movement, and thereby a fixed magnetic field is formed to enable a primary side as a mover element to perform reciprocating linear movement. The construction of the secondary side of the linear motor mainly includes a base (20), multiple magnetic members (30) and a combining mechanism (40).

The base (20) has multiple plates (21) sequentially stacked into a block. The plates (21) in the present embodiment are plate-shaped objects made of a silicon steel material by punching, and are coated with an insulating layer on the surfaces thereof.

The magnetic members (30) are block-shaped and are attached, in a separated manner, onto a side surface (211) of the block formed by stacking the plates (21).

The combining mechanism (40) has multiple rivets (41) and multiple rivet protrusions (42).

The rivets (41) are rod-shaped with rod shafts being in the stacking direction of the plates (21), and penetrate through and are fixedly connected to the plates (21), thereby connecting in series and combining the plates (21) to maintain the integrity of the stacking construction.

The rivet protrusions (42) are formed by punching the plates (21), and protrude from one side of the plates (21) and are combined with the adjacent plates (21) respectively. The technical solution of riveting combination belongs to the disclosed technique of combining through riveting points in the prior art, and the detailed descriptions are not repeated in the present application, but it should be particularly noted that the rivet protrusions (42) and the rivets (41) are respectively located between every two adjacent magnetic members (30) in an interlaced manner, thereby forming a specific spacer construction between the magnetic members (30) respectively. As such, when the magnetic members (30) are attached to the base (20), the positioning becomes easier, the difficulty of attachment is reduced and detachment of the magnetic members is avoided.

Figure 4:
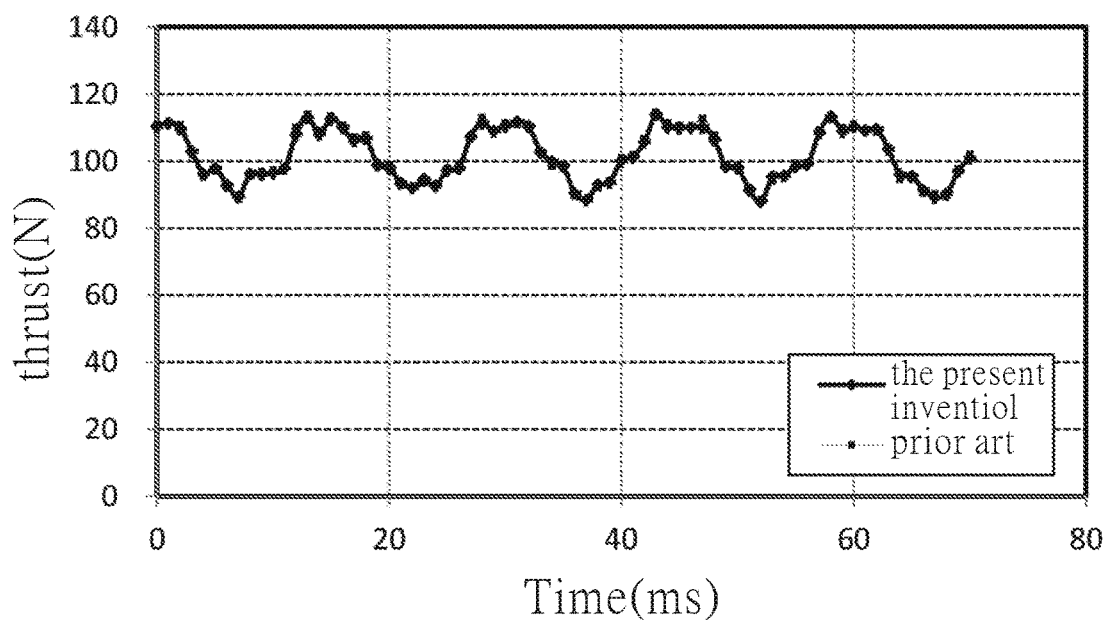
FIG. 4 is a comparison diagram of thrusts between a linear motor using the secondary side of the linear motor according to the embodiment of the present invention as a part and a conventional linear motor.

Therefore, when the secondary side (10) of the linear motor is used as a stator element of a linear motor, the performance of the linear motor is comparable to that of a linear motor in the prior art in terms of thrusts as seen from FIG. 4. However, in the secondary side (10) of the linear motor, the easily made plates (21) can be rapidly and stably combined into a block by the combining mechanism (40), and compared with the prior art, the technical solution provided by the present invention is simpler in the manufacturing process, the working time is largely reduced and the cost is lowered, and the positioning effect provided by the combining mechanism (40) can further facilitate the attaching operation of the magnetic members (30).

Figure 5:
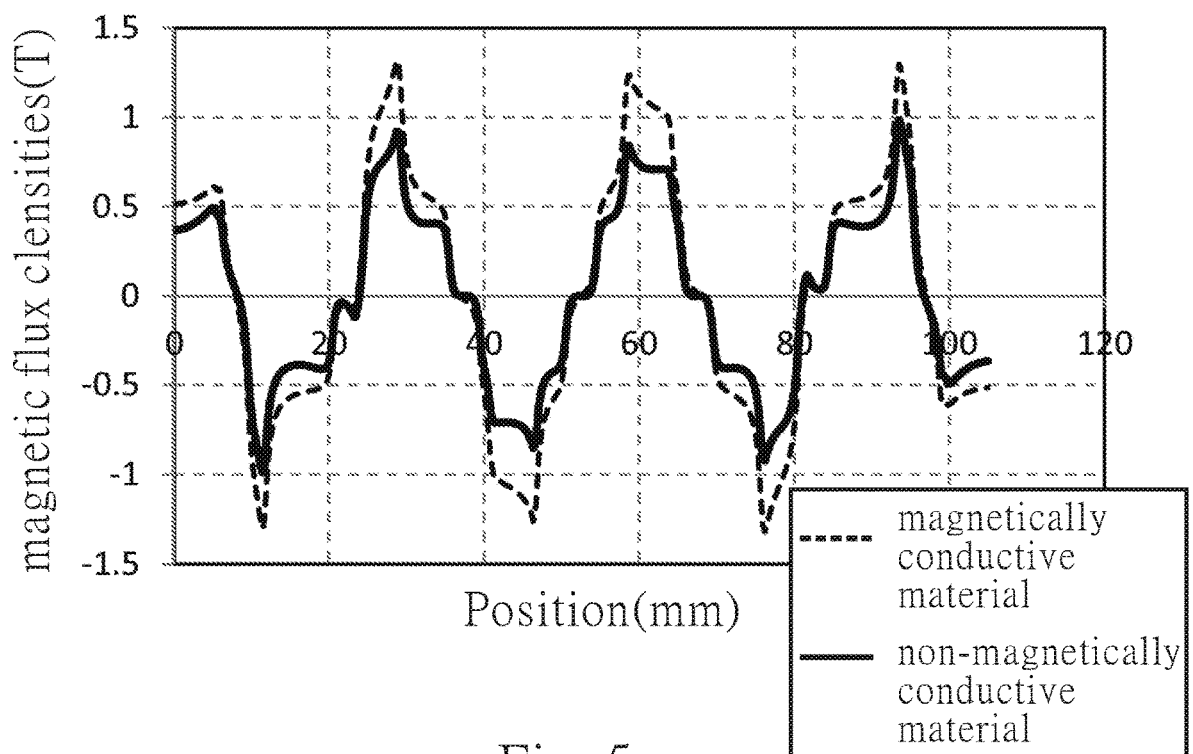
FIG. 5 is a comparison diagram of air-gap magnetic flux densities of a linear motor when the materials of plates in the secondary side of the linear motor according to the embodiment of the present invention are magnetically conductive or non-magnetically conductive.
Figure 6:
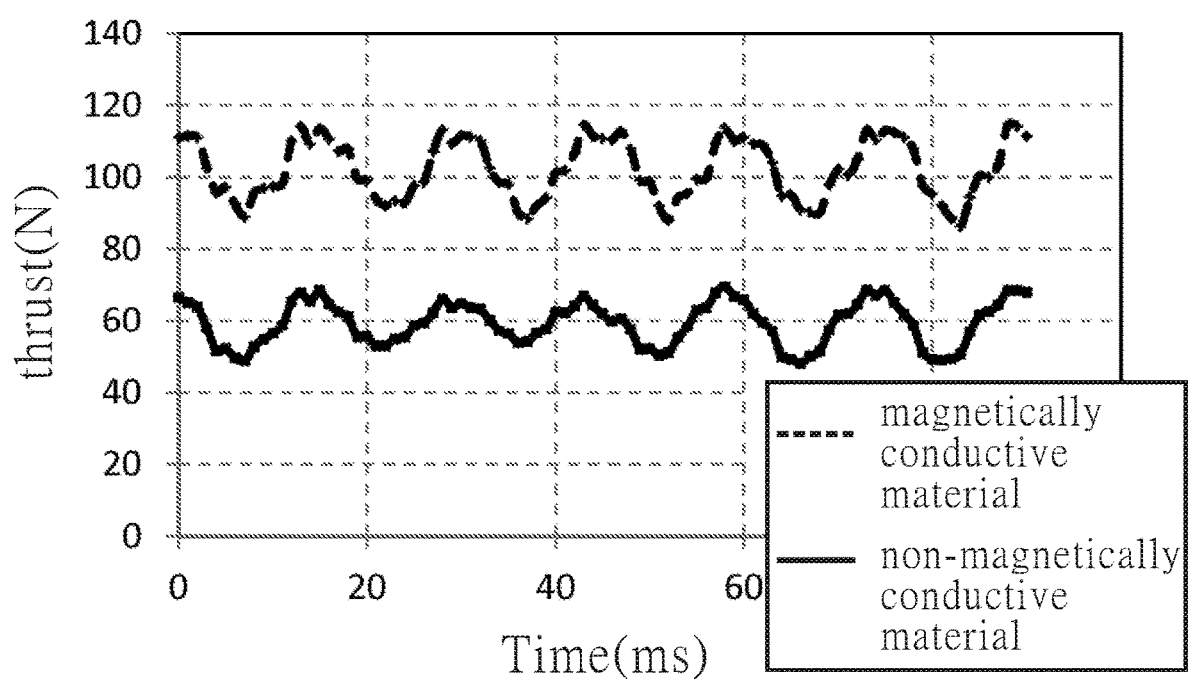
FIG. 6 is a comparison diagram of thrusts of a linear motor when the materials of the plates in the secondary side of the linear motor according to the embodiment of the present invention are magnetically conductive or non-magnetically conductive.

In the technique provided by the present invention, besides the magnetically conductive silicon steel material disclosed in the above embodiment, the materials of the plates may also be other non-magnetically conductive materials, and the performance of the linear motor may be influenced by adopting different materials. Referring to FIG. 5 and FIG. 6, when a magnetically conductive silicon steel material is adopted, compared with the circumstance in which a non-magnetically conductive material is adopted, the magnetic return path is increased and is closed and the air-gap magnetic flux density is larger, and for the specific comparison results, when a magnetically conductive material is adopted, the output characteristics of the linear motor are 40% higher than that of the linear motor adopting a non-magnetically conductive material.

Of course, whether the materials of the plates are all the same or different materials are used is not limited; plates made of other materials or made of different materials may be stacked into a block according to actual demands in the art; and such simple variations still fall within the technical features of the present invention.

Figure 7:
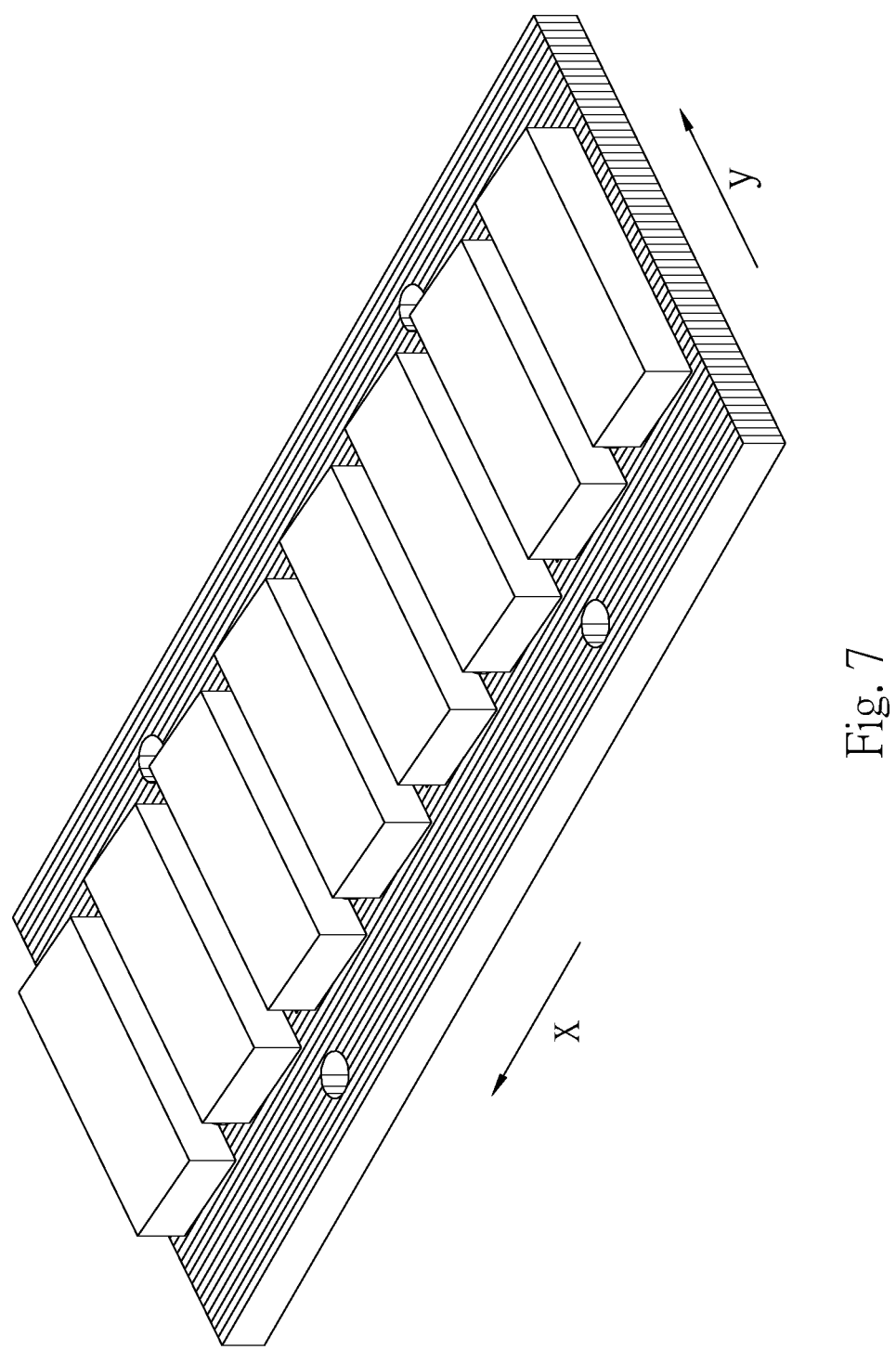
FIG. 7 is a perspective view of a secondary side of a linear motor according to another embodiment of the present invention.
Figure 8:
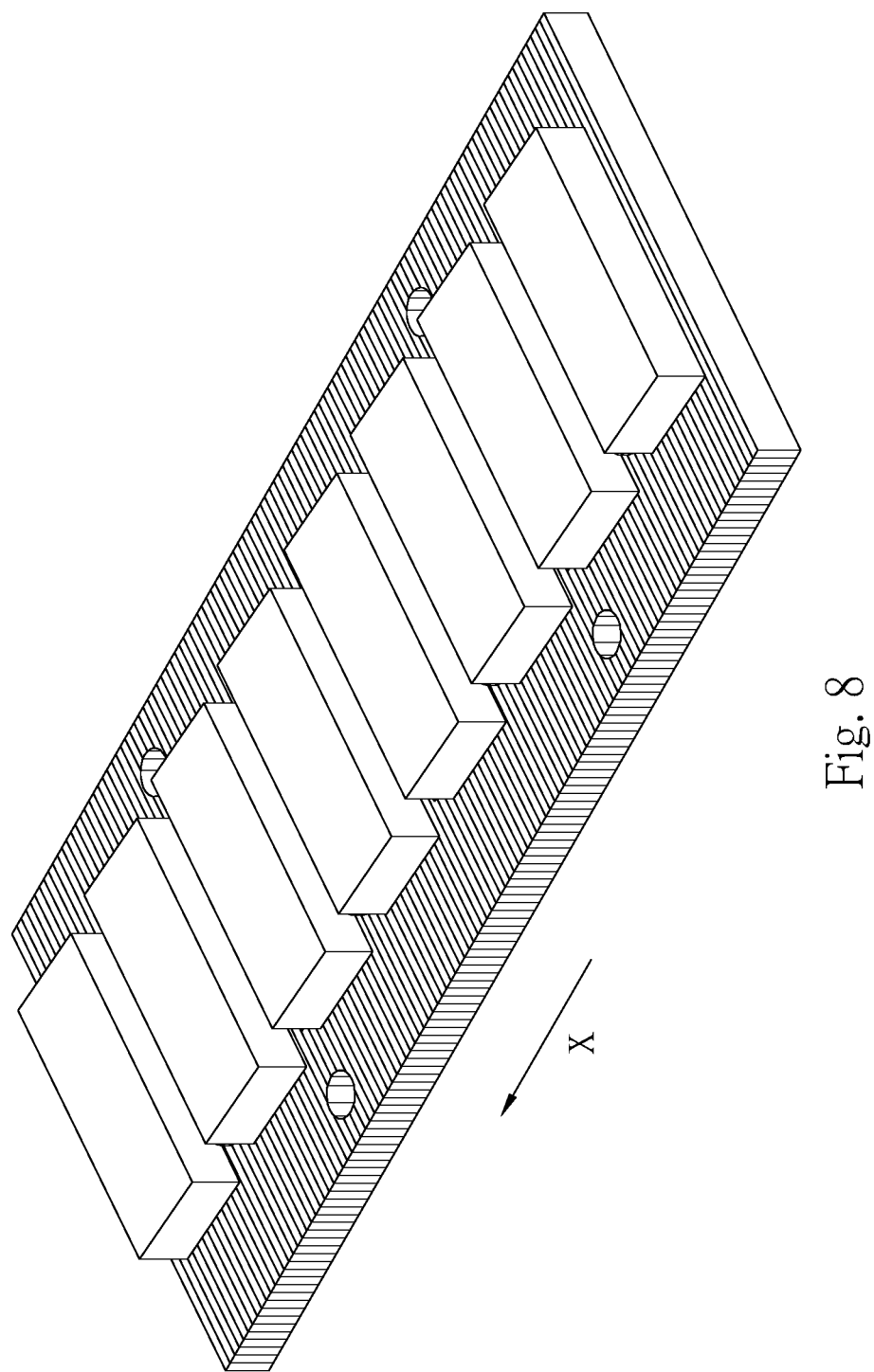
FIG. 8 is a perspective view of a secondary side of a linear motor according to yet another embodiment of the present invention.

Moreover, the stacking direction of the plates is not limited. When the direction of a thrust provided by the linear motor is set as an X-axis, in addition to a perpendicular Z-axis direction, the plates may also be stacked in a Y-axis (as shown in FIG. 7) direction or in the X-axis (as shown in FIG. 8) direction, which are all specific feasible stacking directions, wherein the Y-axis is perpendicular to the X-axis and is in the same horizontal plane with the X-axis, and the Z-axis is perpendicular to the X-axis and is in the same vertical plane with the X-axis. In other words, the stacking direction of the plates is not necessarily limited.

Furthermore, thermal insulation is relatively important because linear motors are generally applied in the technical field of precision machines. When the block formed by stacking the plates is used as a stator base in the present invention, different stacking directions may be adopted to accommodate service environments of different settings, and an appropriate thermal insulating layer may be further added in the stacked plate-shaped bodies, or a thermal insulating layer is merely attached onto a side surface of the stacked block. In this way, a better thermal insulation effect is achieved between the linear motor and a device in which the linear motor is disposed, and basic requirements of precision machines are satisfied.

It should be further particularly noted that, in addition to the above specific implementation aspects disclosed in the above embodiment, the combining mechanism included in the main technical features of the present invention also has the following equivalent technical means:

1. The combining mechanism may actually be formed by rivets or rivet protrusions only, and the mixed use of rivets and rivet protrusions in the above embodiment is not necessary.

2. In addition to combination through combining elements, welding may be performed on the periphery of the block formed by stacking the plate-shaped bodies, and the weld bead formed by welding functions as the combining mechanism described in the present invention.

3. In addition to combining elements such as rivets or rivet protrusions or technical means such as welding or fusion, adhesion may be used as the specific technical means of the combining mechanism, and the stacked plates are bonded by using an adhesive.

In other words, the combining mechanism provides sufficient combining strength to the plates stacked into a block, to resist the attraction and repulsion effects between the primary side and the secondary side, thereby ensuring that the plates are not stripped from each other. Therefore, the combining mechanism shall cover all the technical means capable of achieving the above function, and is not limited to the above description.

What is claimed is:

1. A secondary side of a linear motor, comprising:
    a base, having multiple plates that are plate-shaped bodies sequentially stacked into a block;
    a combining mechanism, for combining the plate-shaped bodies; and
    multiple magnetic members, disposed on the base separately;
    wherein the plates are sequentially stacked in a Z-axis direction, the Z-axis direction being perpendicular to an X-axis direction in which a linear motor formed by the secondary side of the linear motor provides a thrust and being in the same vertical plane with the X-axis direction;
    wherein the combining mechanism has multiple rivet protrusions respectively protruding from the plates and extending to be combined with adjacent plate-shaped bodies of the plate-shaped bodies, and the rivet protrusions are respectively located between adjacent magnetic members of the multiple magnet members.

2. The secondary side of the linear motor according to claim 1, wherein at least a part of each plate is made of magnetically conductive or non-magnetically conductive materials.

3. The secondary side of the linear motor according to claim 1, wherein the combining mechanism has multiple rivets respectively penetrating through the stacked plate-shaped bodies, and the rivets are respectively located between the adjacent magnetic members.

4. The secondary side of the linear motor according to claim 1, wherein the combining mechanism has an adhesive applied between the plate-shaped bodies.

5. The secondary side of the linear motor according to claim 1, wherein the combining mechanism has at least one weld bead formed on one side of the base by welding.

6. The secondary side of the linear motor according to claim 1, wherein the base further comprises a thermal insulating layer located on a side surface of the block formed by stacking the plate-shaped bodies.

* * * * *